United States Patent [19]

Leopold

[11] Patent Number: 5,601,677
[45] Date of Patent: Feb. 11, 1997

[54] METHOD OF MAKING A GLAZING UNIT HAVING THREE OR MORE GLASS SHEETS AND HAVING A LOW THERMAL EDGE

[75] Inventor: Edmund A. Leopold, Hudson, Ohio

[73] Assignee: PPG Industries, Inc., Pittsburgh, Pa.

[21] Appl. No.: 449,595

[22] Filed: May 24, 1995

Related U.S. Application Data

[62] Division of Ser. No. 102,596, Aug. 5, 1993, Pat. No. 5,531,047.

[51] Int. Cl.⁶ .............................. B29C 47/02; E06B 3/64; E06B 3/673
[52] U.S. Cl. .................. 156/109; 156/293; 156/244.11; 52/172; 52/786.13
[58] Field of Search ........................... 156/99, 100, 107, 156/108, 109, 293, 295, 303.1, 244.11, 578, 297; 52/171.3, 172, 786.13; 264/171.1, 171.21, 172.1, 177.1

[56] References Cited

U.S. PATENT DOCUMENTS

| | | | |
|---|---|---|---|
| 1,985,909 | 1/1935 | Ziepke | 52/204.593 |
| 2,834,999 | 5/1958 | Taylor et al. | 52/172 |
| 2,883,718 | 4/1959 | Persson | 52/209 |
| 3,340,224 | 9/1967 | Sherman et al. | 156/293 X |
| 3,424,836 | 1/1968 | McKelvey et al. | 156/244.11 X |
| 3,473,988 | 10/1969 | Rullier et al. | 156/107 |
| 3,652,380 | 3/1972 | Strack | 428/356 |
| 3,735,553 | 5/1973 | Houser | 53/86 |
| 3,758,996 | 9/1973 | Bowser | 55/385.1 |
| 3,759,771 | 9/1973 | Battersby | 156/244.11 X |
| 3,872,198 | 3/1975 | Britton | 156/293 X |
| 3,935,683 | 2/1976 | Derner et al. | 52/172 |
| 4,149,348 | 4/1979 | Pyzewski | 52/172 |
| 4,167,431 | 9/1979 | Wong | 156/244.11 X |
| 4,266,383 | 5/1981 | Krueger et al. | 52/204.597 |
| 4,431,691 | 2/1984 | Greenlee | 428/34 |
| 4,547,994 | 10/1985 | Adell | 156/244.11 X |
| 4,604,840 | 8/1986 | Mondon | 52/172 |
| 4,610,711 | 9/1986 | Matesa et al. | 65/134.9 |
| 4,780,164 | 10/1988 | Rueckheim et al. | 156/104 |
| 4,792,536 | 12/1988 | Pecoraro et al. | 501/70 |
| 4,806,220 | 2/1989 | Finley | 204/192.27 |
| 4,825,609 | 5/1989 | Rundo | 52/202 |
| 4,853,256 | 8/1989 | Obringer et al. | 427/152 |
| 4,853,257 | 8/1989 | Henery | 427/166 |
| 4,873,206 | 10/1989 | Jones | 501/71 |
| 5,007,217 | 4/1991 | Glover et al. | 52/172 |
| 5,030,593 | 7/1991 | Heithoff | 501/72 |
| 5,313,761 | 5/1994 | Leopold | 52/786.1 |

FOREIGN PATENT DOCUMENTS

| | | |
|---|---|---|
| 505307 | 2/1979 | Australia . |
| 37533/85 | 7/1985 | Australia . |
| 39353/89 | 2/1991 | Australia . |
| 76329/91 | 11/1991 | Australia . |
| 0475213 | 3/1992 | European Pat. Off. . |
| 1338179 | 8/1963 | France . |
| 63-260423 | 10/1988 | Japan . |

*Primary Examiner*—Michael W. Ball
*Assistant Examiner*—Francis J. Lorin
*Attorney, Agent, or Firm*—Donald C. Lepiane

[57] ABSTRACT

A method for making a glazed unit having three sheets. The unit includes a pair of outer glass sheets secured to outer legs of a spacer having a generally U-shaped cross section. On the base of the spacer between the outer legs is provided a layer of pliable material having a generally U-shaped cross section and having a desiccant therein. A third or intermediate glass sheet has its edge portion in the groove formed by the layer of pliable material. Movement of the third sheet toward an outer glass sheet is limited by the cooperation of the layer of the pliable material and portion of the outer legs of the spacer at the corners of the unit bent inwardly to move the layer of pliable material at the corner toward the unit during fabrication of the unit.

20 Claims, 4 Drawing Sheets

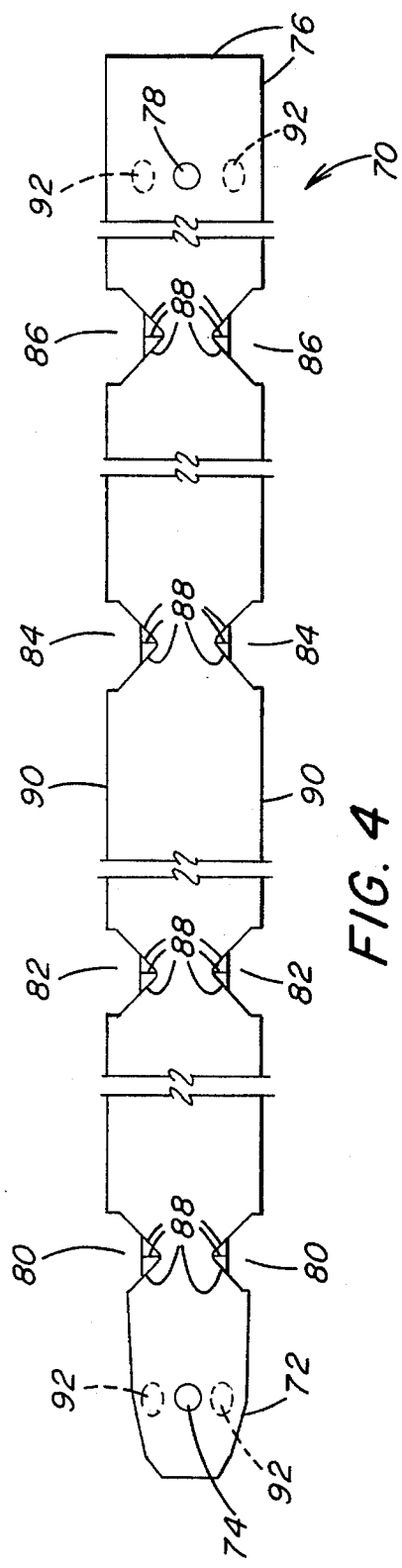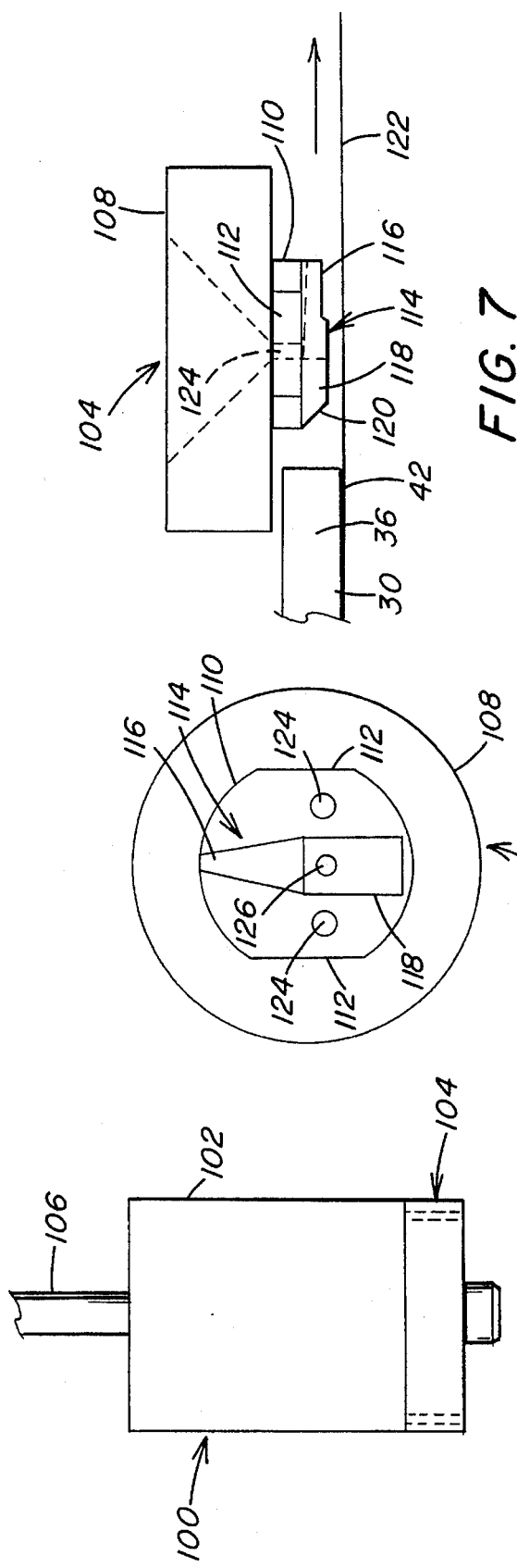

METHOD OF MAKING A GLAZING UNIT HAVING THREE OR MORE GLASS SHEETS AND HAVING A LOW THERMAL EDGE

This is a division of application Ser. No. 08/102,596, filed Aug. 5, 1993 now U.S. Pat. No. 5,531,047.

FIELD OF THE INVENTION

This invention relates to a method of making a glazing unit having three or more glass sheets, and, in particular to a triple glazed unit having a pair of outer glass sheets separated by an edge assembly having low thermal conductivity, the edge assembly including a spacer arrangement for supporting a glass sheet between the outer glass sheets.

BACKGROUND OF THE INVENTION

European Patent Application Publication Number 0 475 213 A1 published 18.03.92 Bulletin 92/12 (hereinafter "The EP Application") based on U.S. Patent Applications Ser. Nos. 578,697 filed Sep. 4, 1990; 578,696 filed Sep. 4, 1990, and 686,956 filed Apr. 18, 1991, teaches a glazing unit having an edge assembly having low thermal conductivity and a method of making same. In general, The EP Application teaches an insulating unit having a pair a groove to maintain a third glass sheet between the outer two glass sheets.

Although the triple glazed unit taught in U.S. Patent No. 4,149,348 is acceptable, there are limitations. More particularly, the spacer-dehydrator element is structurally stable and is formed with a groove prior to its use. The spacer has desiccant therein; therefore, it is stored in a dry environment to prevent adsorption of moisture by the desiccant. The metal spacer has to be formed to have a groove; the additional forming increases the fabrication cost of the spacer. Further, the groove formed in the spacer disclosed is U.S. Pat. No. 4,149,348 maintains the third glass sheet spaced from the outer sheets; therefore, the groove has to be properly sized to prevent movement of the inner sheet relative to the outer sheets.

As can be appreciated, it would be advantageous to provide an insulating unit having three or more sheets that does not require storage of prefabricated materials e.g. a spacer-dehydrator element having a groove, does not require shaping the spacer to have a groove, and does not depend solely on the groove formed in the spacer to secure the intermediate sheet in position.

SUMMARY OF THE INVENTION

The invention relates to a method of making an insulating glazing unit having at least three sheets including the steps of providing two glass sheets having substantially the same peripheral configuration and dimensions and a spacer of a predetermined length having a receiving surface. In one embodiment of the invention, the spacer is formed by providing notches at selected positions on a flat bendable substrate to provide opposed pair of notches defining bend areas of the spacer. The flat substrate is shaped to provide a spacer having a generally U-shaped cross section defined by a first outer leg, a base and a second outer leg. A shaped layer of a flowable material e.g. a pliable material or a material that hardens after flowing and is dimensionally stable, having a groove is provided on the receiving surface of the spacer. The glass sheet or sheets to be positioned between the outer sheets has peripheral configurations similar to the outer glass sheets and peripheral dimensions less than the outer sheets. The spacer is positioned around the edge of the intermediate sheet with the edges of the intermediate sheet in the groove. The intermediate sheet is maintained in a generally fixed position relative to the outer glass sheets by the pliable material and/or the spacer. In one embodiment of the invention, as the spacer having the U-shaped cross section is positioned around the periphery of the third sheet, the wall portions of the spacer at the bend areas are bent inward toward one another urging the pliable material toward the corner areas of the intermediate sheet. The layer of the pliable material may have a desiccant mixed therein. The outer glass sheets are secured to the outer surfaces of the legs of the spacer by an adhesive, e.g. by a moisture and/or gas impervious adhesive.

BRIEF DESCRIPTION OF THE DRAWINGS

FIG. 4 is a fragmented elevated view of a substrate having portions removed prior to forming a spacer used in the practice of the invention.

FIG. 5 is an elevated side view of a nozzle incorporating features of the invention for extruding a shaped layer of adhesive on the base of a spacer in accordance to the teachings of the invention.

FIG. 6 is a plane view of the tip of the nozzle illustrating features of the invention.

FIG. 7 is a side view of the tip of the invention.

BRIEF DESCRIPTION OF THE INVENTION

The glazing unit of the instant invention will be discussed having the edge assembly disclosed in The EP Application which teachings are hereby incorporated by reference. As will be appreciated the instant invention is not limited to the configuration of the spacer disclosed therein, and other spacer configurations may be used in the practice of the invention to maintain the at least three spaced sheets in spaced relationship to one another; i.e. prevent or minimize movement of the intermediate sheet toward an outer sheet.

Figure 1:
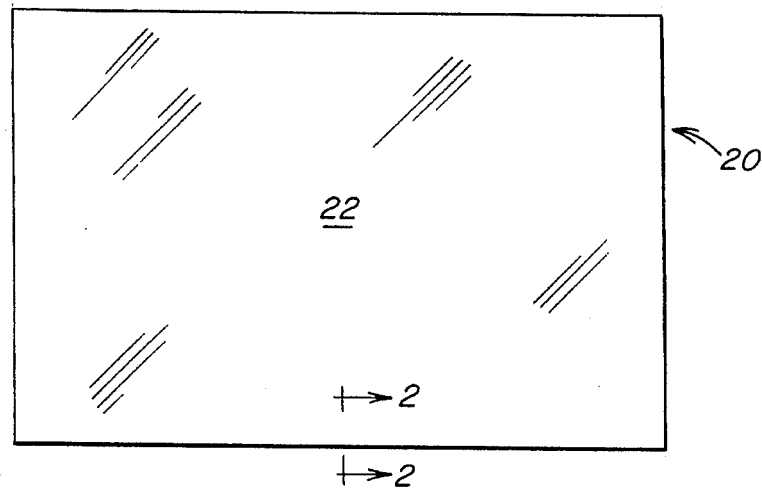
FIG. 1 is a frontal view of a triple glazed unit incorporating features of the invention.
Figure 2:
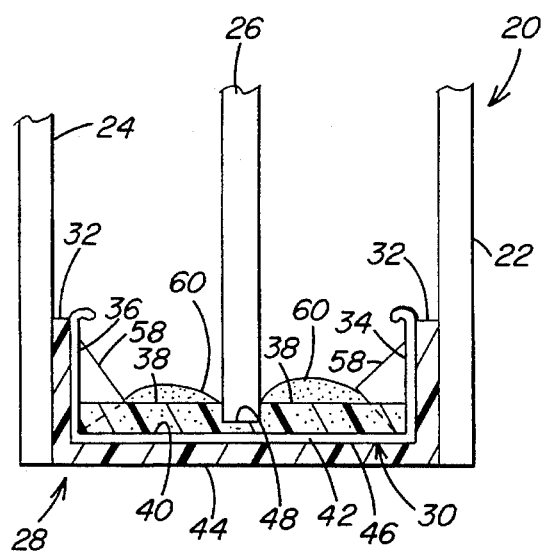
FIG. 2 is the view taken along lines 2—2 of FIG. 1.

With reference to FIGS. 1 and 2 there is shown a glazing unit 20 incorporating features of the invention. With specific reference to FIG. 2 the unit 20 includes a pair of outer sheets 22 and 24 and an intermediate sheet 26. The outer sheets 22 and 24 and the intermediate sheet 26 are maintained in spaced relationship by an edge assembly or spacer arrangement 28.

In the following discussion the sheets 22, 24 and 26 are referred to as glass sheets; however, as will become apparent, the materials of the sheets are not limited to glass and any one or all of the sheets may be made of any similar or dissimilar material e.g. plastic, metal or wood. Further, one or more of the sheets may be coated e.g. glass or plastic transparent sheets may have an opaque coating of the type used in making spandrels. Still further, one or more of the glass or plastic transparent sheets may have an environmental coating on one or more of the sheet surfaces to selectively pass predetermined wavelength ranges of light. More particularly, glass sheets may have coatings to filter portions of the infrared range e.g. low E coatings and/or coatings to reflect light e.g. reflective coatings. Although not limiting to the invention, coatings disclosed in U.S. Pat. Nos. 4,610,711; 4,806,220 and 4,853,256 which teachings are hereby incorporated by reference may be used in the practice of the invention. Still further, one or more of the glass sheets may be coated and or uncoated colored sheets. Although not limiting to the invention, colored sheets of the type disclosed in U.S. Pat. Nos. 4,873,206; 5,030,593 and 4,792,536 which teachings are hereby incorporated by reference may be used in the practice of the invention.

The outer glass sheets 22 and 24 may have the same peripheral configuration and dimensions; however, as can be appreciated, one outer glass sheet may be larger than the other outer glass sheet and may have a different peripheral configuration.

The edge assembly 28 includes a spacer 30 having a generally U-shaped cross section as shown in FIG. 2, an adhesive layer 32 on outer surfaces of outer legs 34 and 36 of the spacer 30 and a shaped layer 38 of material (to be discussed below) on inner surface 40 of base 42 of the spacer 30. A layer 44 of a material similar to or dissimilar to the material of the layers 32 may be provided over outer surface 46 of the base 42 of the spacer 30 as shown in FIG. 2.

As can be appreciated, the configuration of the spacer is not limiting to the invention and may have any cross section provided it has a surface to receive the shaped layer 38 and the intermediate glass sheet 26. For example and with reference to FIG. 3, there is shown a unit 50 having the glass sheets 22 and 24 separated by an edge assembly 52 having the adhesive layers 32 to secure the glass sheets 22 and 24 to spacer 54. The spacer 54 may be made of wood, metal or plastic having any cross sectional configuration and a receiving surface 56 to receive the shaped layer 38 in a similar fashion as the surface 40 of the spacer 30 of the edge assembly 28 shown in FIG. 2.

As discussed, the spacers 30 and 54 may be made of any material and configuration that preferably provides structural stability to maintain the outer glass sheets 22 and 24 in spaced relationship to one another when biasing forces are applied to secure the glazing unit in a sash or a curtainwall system. Further the spacers 30 and 54 should have a substantially flat surface to receive the shaped layer 38. Although the spacers 42 and 54 may be made of any material and have any configuration provided it has a receiving surface, it is preferred that the spacer have low thermal conductivity so that the edge assembly 28 shown in FIG. 2, and the edge assembly 52 shown in FIG. 3, have a low thermal conductivity or high RES-value and are made of moisture and/or gas impervious materials.

In regards to the edge assembly having a low thermal conductivity, spacers made of aluminum conduct heat better than spacers made of metal coated steels e.g. galvanized or tin plated steel, spacers made of metal coated steels conduct heat better than spacers made of stainless steels, and spacers made of stainless steels conduct heat better than spacers made of plastics. Plastic provides a better spacer from the standpoint of low thermal conductivity; however, metal is preferred for spacers because it is easier to shape and lends itself more easily to automation than plastic.

The EP Application discusses in detail how RES-value is determined and the contributions of the components of the edge assembly to the RES-value. The following is a less detailed discussion.

The heat loss through an edge of a unit is a function of the thermal conductivity of the materials used, their physical arrangement, the thermal conductivity of the frame and surface film coefficient. Surface film coefficient is transfer of heat from air to glass at the warm side of the unit and heat transfer from glass to air on the cold side of the unit. The surface film coefficient depends on the weather and the environment. Since the weather and environment are controlled by nature and not by unit design, no further discussion is deemed necessary. The frame or sash effect is not relevant in the present discussion because the discussion is directed to the thermal conductivity of the materials at the unit edge and their physical arrangement.

The resistance of the edge of a unit to heat loss for an insulating unit having sheet material separated by an edge assembly is given by equation (1).

$$RHL = G_1 + G_2 + \ldots + G_n + S_1 + S_2 + \ldots + S_n \quad (1)$$

where

RHL is the resistance to edge heat loss at the edge of the unit in hour - °F./BTU-inch of unit perimeter (Hr-°F./BTU-in.)

G is the resistance to heat loss of a sheet in Hr-°F./BTU-in.

S is the resistance to heat loss of the edge assembly in Hr-°F./BTU-in.

For an insulating unit having two sheets separated by a single edge assembly equation (1) may be rewritten as equation (2).

$$RHL = G_1 + G_2 + S_1 \quad (2)$$

The thermal resistance of a material is given by equation (3).

$$R = L/kA \quad (3)$$

where

R is the thermal resistance in Hr-°F./BTU-in.

k is thermal conductivity of the material in BTU/hour-inch-°F.

l is the thickness of the material as measured in inches along an axis parallel to the heat flow.

A is the area of the material as measured in square inches along an axis transverse to the heat flow.

The thermal resistance for components of an edge assembly that lie in a line substantially perpendicular or normal to the major surface of the unit is determined by equation (4).

$$S = R_1 + R_2 + \ldots + R_n \quad (4)$$

where S and R are as previously defined.

In those instances where the components of an edge assembly lie along an axis parallel to the major surface of the unit, the thermal resistance (S) is defined by the following equation (5).

$$R = \frac{1}{\frac{1}{R_1} + \frac{1}{R_2} + \ldots + \frac{1}{R_n}} \quad (5)$$

where R is as previously defined.

Combining equations (2), (4) and (5), the resistance of the edge of the unit 20 shown in FIG. 2 to heat flow may be determined by following equation (6).

$$RHL = R_{22} + R_{24} + 2R_{32} + 2R_{34} + \frac{1}{\frac{1}{R_{42}} + \frac{1}{R_{38}} + \frac{1}{R_{44}}} \quad (6)$$

where

RHL is as previously defined, $R_{22}$ and $R_{24}$ are the thermal resistance of the glass sheets, $R_{32}$ is the thermal resistance of the adhesive layer 32, $R_{44}$ is the thermal resistance of the adhesive layer 44, $R_{34}$ is the thermal resistance of the outer legs 34 of the spacer 30, $R_{42}$ is the thermal resistance of the base 42 of the spacer 30, $R_{38}$ is the thermal resistance of the adhesive layer 38, and $R_{26}$ is the thermal resistance of the middle sheet 26.

For ease of discussion, equation (6) does not consider the thermal conducting contribution of the intermediate sheet 26. If the thermal conductivity contribution of the intermediate sheet 26 were considered, it is expected that the value of RHL in equation (6) would be about 10% higher than the value calculated without considering the contribution of the thermal conductivity of the intermediate sheet 26. In the RES-value given in the specification and claims the RES-value does not include the contribution of the intermediate sheet 26.

Although equation (6) shows the relation of the components to determine edge resistance to heat loss, Equation 6 is an approximate method used in standard engineering calculations. Computer programs are available which solve the exact relations governing heat flow or resistance to heat flow through the edge of the unit.

One computer program that is available is the thermal analysis package of the ANSYS program available from Swanson Analysis Systems Inc. of Houston, Pa. The discussion of the edge resistance of the edge assembly (excluding the outer glass sheets) will now be considered. The edge resistance of the edge assembly is defined by the inverse of the flow of heat that occurs from the interface of the glass sheet 22 and adjacent sealant layer 32 at the inside side of the unit to the interface of glass sheet 24 and adjacent sealant layer 32 at the outside side of the unit per unit increment of temperature, per unit length of edge assembly perimeter (including the intermediate sheet). The outer glass sealant interfaces are assumed to be isothermal to simplify the discussion. Support for the above position may be found, among other places, in the paper entitled Thermal Resistance Measurements of Glazing System Edge-Seals and Seal Materials Using a Guarded Heater Plate Apparatus written by J. L. Wright and H. F. Sullivan ASHRAE TRANSACTIONS 1989, V.95, Pt.2.

Figure 3:
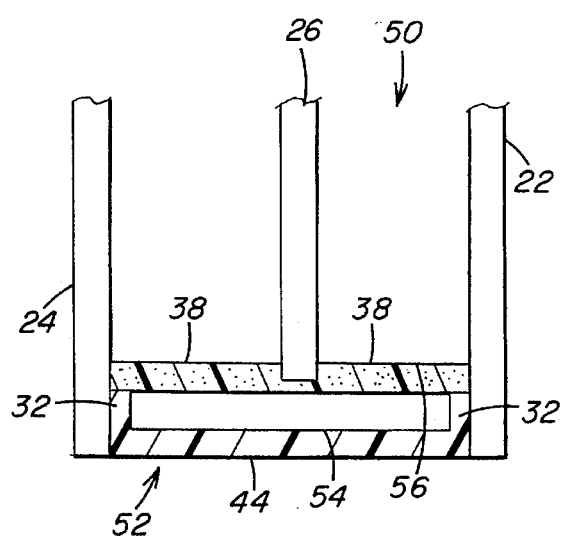
FIG. 3 is a view similar to the view of FIG. 2 illustrating another embodiment of an edge assembly incorporating features of the invention.

In the discussion of the instant invention and in the claims, RES-value is defined as the resistance to heat flow of the edge assembly e.g. the edge assembly 28 in FIG. 2 and the edge assembly 52 in FIG. 3, per unit length of perimeter.

With continued discussion of the instant invention, the materials of the adhesive layers 32 and the layer 44 are not limiting to the invention and are preferably a material that is moisture and/or gas impervious to prevent the ingress of moisture into the compartment between the sheets. Although not limiting to the invention, butyl hot melts of the type sold by H. B. Fuller e.g. H. B. Fuller 1191 may be made in the practice of the invention. Units filled with an insulating gas e.g. Argon preferably have the adhesive layer 32 and the layer 44 of a moisture and/or gas impervious material to maintain the insulating gas in the compartment between the sheets 24, 26 and 26, 22. It is recommended that the adhesive layer 32 or sealant layer 32 be thin and long to reduce the diffusion of the insulating gas out of the compartments of the unit or atmosphere's gas into the compartments of the unit. More particularly, increasing the thickness of the layer 32 i.e. the distance between the glass sheet and the adjacent leg of the spacer while keeping all other conditions constant increases the diffusion rate, and increasing the length of the layer 32 i.e. the distance between the top of the outer leg of the spacer and the peripheral edge of the sheets or the outer surface 46 of the spacer 30 as viewed in FIG. 2 while keeping all other conditions constant decreases the diffusion rate of gas through the adhesive layer 32. The invention may be practiced with the adhesive layer 32 having a thickness less than about 0.125 inch (0.32 cm) and more particularly, of about 0.005 inch (0.013 cm) to about 0.125 inch (0.32 cm), preferably about 0.010 inch (0.025 cm) to about 0.020 inch (0.050 cm) and most preferably about 0.015 inch (0.38 cm), and a height of greater than about 0.010 inch (0.025 cm), and more particularly, of about 0.010 inch (0.025 cm) to about 0.50 inch (1.27 cm), preferably about 0.125 inch (0.32 cm) to about 0.50 inch (1.27 cm) and most preferably about 0.200 inch (0.50 cm).

As can be appreciated the thickness and length of the layer 32 may change as the moisture and/or gas resistance value of the moisture and/or gas impervious material changes. For example as the resistance value of the material increases, the thickness of the layer 32 may be increased and the length of the layer 32 decreased and as the resistance value of the material decreases, the thickness of the layer 32 should be decreased and the length of the layer 32 should be increased. Adhesives that may be used in the practice of the invention include but are not limited to butyls, silicons, polyurethane adhesives and are preferably butyls and polyurethanes such as H. B. Fuller 1191, H. B. Fuller 1081A and PPG Industries, Inc. 4442 butyl sealant.

With respect to the loss of the fill gas e.g. an insulating gas such as Argon from the unit, in practice the length and thickness of the layer 32 are chosen in combination with the gas permeability of the material so that the rate of loss of the fill gas matches the desired unit performance lifetime. The ability of the unit to contain the fill gas is measured using a European procedure identified as DIN 52293. Preferably, the rate of loss of the fill gas should be less than 5% per year and, more preferably, it should be less than 1% per year.

The preferred material for the layer 32 should have a moisture permeability of less than 20 gm mm/M$^2$ day using ASTM F 372–73 and more preferably less than 5 gm mm/M$^2$ day.

As can be appreciated, the spacer 30 should also be made of a material that is moisture and/or gas impervious e.g. metal or plastic of the type disclosed in The EP Application such as but not limited to metal coated steels, stainless steel, gas pervious spacers covered with a metal or polyvinylidene chloride film and/or a halogenated polymeric material.

In FIG. 2 there is shown the layer 44 provided on the outer surface 46 of the spacer 30. The layer 44 may be a material similar to the material of the layers 32 and is preferably non-tacky so that the units when stored or shipped do not stick to the supporting surface. Further when the units have the layer 44, the spacer 30 is preferably below the peripheral edges of the sheets 22 and 24 to provide a channel to receive the layer 44. The thickness of the layer 44 is not limiting to the invention and where used increases the RES-value because of the thermal insulating properties of the sealant. The invention may be practiced with no layer 44 to a layer 44 having a thickness of about 0.50 inch (1.27 cm), preferably about 0.062 inch (0.16 cm) to about 0.250 inch (0.64 cm) and most preferably about 0.150 pinch (0.38 cm). Preferably the layer 44 has similar moisture and gas resistance values on the layers 32.

With specific reference to FIG. 2, the layer 38 is shaped to provide a groove 46 to receive the peripheral edge of the intermediate sheet 26. The material selected for the layer 38 is a material that is flowable onto the receiving surface 40 of the base 42 of the spacer 30 and adheres thereto as contrasted to a preformed material of the type taught in U.S. Pat. No. 4,149,348. Using a flowable material in accordance to the disclosure of the instant invention provides for ease of automating the fabrication of the spacer, edge assembly and/or units, as will be appreciated in the following discussion. The term "flowable material" means a material that may be flowed onto a surface, for example but not limited to the invention by extrusion or pumping. In the selection of the materials for the layer 38, consideration has to be given to maintaining the intermediate sheet 26 in position, e.g. prevent or limit its movement toward one of the outer sheets. Materials that are most preferably used in the practice of the invention are those materials that are flowable and remain pliable after flowing and materials that are flowable and harden e.g. are dimensionally stable after flowing. The term "pliable materials" means materials that have a Shore A Hardness of less than 45 after 10 seconds under load. Pliable materials that may be used in the practice of the invention have a Shore A Hardness of less than 40 after 10 seconds. Pliable materials used in the practice of the invention had a Shore A Hardness of 25 with a range of 20–30 after 10 seconds. The term "hardened material" is a material other than a pliable material.

In the instance where the intermediate sheet 26 is to be held in position only by the shaped layer 38, the layer 38 should be a material that is flowed onto the surface 40 of the spacer to provide the groove layer 38, and, thereafter, the material is sufficiently rigid to maintain the intermediate glass sheet in position. In the instance where the material is flowed onto the base and is not sufficiently rigid, it is recommended that facilities be provided to secure the intermediate glass in position. Also if the material of the layer 38 requires time to become sufficiently rigid and the unit is to be moved prior to setting of the layer 38, it is recommended that facilities be provided to secure the intermediate glass in position. The preferred manner in either instance is to use the spacer 30 alone or in combination with the layer 38 in a manner to be discussed below. Other external facilities such as spacer blocks may be used in the practice of the invention.

The EP Application teaches a spacer frame having a continuous corner which may be used in the practice of the invention to limit movement of the intermediate sheet 26. With reference to FIG. 2, the continuous corners are formed by portions 58 (see FIG. 2) of the legs 34 and 36 of the spacer 30 biased toward one another at the corner over the receiving surface 40 of the spacer 30. By selectively removing material from the biased portions 58 of the legs of the spacer, a space is provided between the biased portions to accommodate the intermediate sheet. To prevent damage to the intermediate sheet when such sheet is made of glass by contacting the bent portions 58, the space between the bent portions can be increased in a manner discussed below. As the bent portions 58 of the legs 34 and 36 are urged toward one another, portions 60 of the shaped layer 38 are moved against the intermediate glass sheet and are shown by numeral 60 in FIG. 2.

As can be appreciated, the spacer of The EP Application may be used with material that is sufficiently rigid to hold the sheet as well as materials that are not sufficiently rigid. The further advantage of the continuous corner is that it provides a continuous non-permeable corner to moisture and/or gas penetration.

In the instance where the layer 38 is to carry the desiccant to keep the space between the sheets i.e. compartments dry, the material should be a moisture pervious material. Although the invention is not limited thereto, materials having a permeability greater than 2 gm mm/M$^2$ day as determined by the above reference to ASTM F 372–73 are recommended in the practice of the invention.

As can now be appreciated, the invention is not limited to the number of corners of a unit that may have bent portions 58 to limit movement of the intermediate sheet 26. For a rectangular unit, two opposite corners having bent portions 58 are sufficient to limit movement of the intermediate sheet toward the outer sheets; however, four corners having bent portions 58 are recommended.

In the practice of the invention a unit similar to the unit 10 shown in FIGS. 1 and 2 was made having rectangular shaped coated, clear glass sheets 22, 24 and uncoated, clear glass sheet 26. Each of the outer glass sheets 22 and 24 had a length of about 42⅞ inches (108.9 cm) and a width of about 19¾ inches (50.17 cm). The intermediate sheet had a length of about 42½ inches (107.95 cm) and a width of about 19⅜ inches (49.2 cm).

The glass sheets 22 and 24 each had on a major surface a coating of the type made by PPG Industries sold under its registered trademark Sungate® 100 coated glass. The coated surface of each of the sheets 22 and 24 faced the intermediate sheet 26.

A spacer having four continuous corners was made as follows. With reference to FIG. 4, a flat tin coated steel strip 70 has a length of about 126 inches (320 cm), a width of about 1.30 inches (3.302 cm) and thickness of about 0.010 inch (0.25 mm) with a tapered and swedged end 72 having a hole 74. Opposite end 76 had a hole 78 and receives the end 72 when the spacer is positioned around the intermediate sheet. The taped end 72 had a length of about 1½ inch (3.81 cm). Space at locations about 1.5 inches (3.8 cm), about 21⅛ inches (53.65 cm), about 63⅞ inches (162.24 cm), and about 83½ inches (212.09 cm) from the end 70, material was removed from opposite edge portion of the substrate 70 to provide a set of pair of notches 80, 82, 84 and 86 respectively. The notched areas form the bent portions 58 (see FIG. 2), and the notches provide for the bent portions to be a sufficient distance so as to receive the intermediate sheet. Crease lines 88 were provided at the notches as shown in FIG. 4 for ease of bending the bent portions.

Each of the notches of the set of pair of notches 82, 84 and 86 had a length of about 0.536 inch (1.36 cm) at the edge 90 of the substrate, a depth of about 0.170 inch (0.43 cm) as measured from the edge 90 of the substrate toward the center of the substrate. The notches 80 were similar in size as the notches 82, 84 and 86 but the left side of the notch as shown in FIG. 4 were further cut to accommodate the end 72. The distance between the points of pairs of notches depends on the width of the base i.e. the desired spacing between the outer sheets. The unit made had the point of the crease lines spaced about 0.282 inch (0.71 cm) from the edge of the substrate to provide the base with a width of about 21/32 inch (1.67 cm).

After the substrate 62 had the notches, crease lines and holes, the substrate is shaped to provide the spacer 30 with the U-shaped cross section. With reference to FIG. 2, the ends of the upright legs 34 and 36 are radiused inwardly to provide stability to the spacer e.g. to reduce flexing of the spacer 20 prior to bending it around the glass sheet 26. After the substrate is shaped, the shaped layer 38 were provided by extruding H. B. Fuller HL-5102-X-125 butyl hot melt matrix having a desiccant therein is flowed onto the base of the spacer in using a nozzle arrangement to be discussed below incorporating features of the invention. As can be appreciated, the invention is not limited to the equipment for providing the shaped layer 38. Each of the raised portions of the shaped layer 28 had a height of 0.125 inch (0.32 cm) and a width of 0.255 inch (0.64 cm) to provide a groove having a depth of 0.093 inch (0.23 cm) and a width of 0.125 inch (0.32 cm). It is preferred to have the material of the layer 38 under the sheet to eliminate any contact between the sheet and the base of the spacer to prevent damage to the edge of the sheet.

In the practice of the invention the flat substrate was cut, notched, shaped, and the adhesive applied using the nozzle of the instant invention on, equipment sold by Glass Equipment Development Inc. of Twinsburg, Ohio Model No. HME 55 PHE-L.

Although not limiting to the invention, after the extrusion of the shaped layer 38, the layers 32 are extruded onto the outer walls of the outer legs 24 and 26 of the spacer 20. The sealant adhesive of the layer 32 used was sold by H. B. Fuller as H. B. Fuller 1191 hot melt butyl. The layer 32 had a thickness of about 0.020 inches (0.05 cm) and a height of about 0.300 inch (0.76 cm).

As can be appreciated, the shaped layer 38 may be extruded onto the base of the spacer before, after, or during the extrusion of the layers 32 onto the side of the spacer.

The intermediate sheet 26 was positioned in the groove 48 of the shaped layer 38 between the pair of notches 82 and 84. The spacer between the pair of notches 84 and 86 was bent to position the groove 48 of the layer 38 between the notches 84 and 86 about the edge of the sheet; the spacer between the pair of notches 86 and the end 76 was bent to position the sheet in the groove 48 of the layer 38 therebetween. The tapered end 72 was bent to a 90° angle, and the spacer was bent to position the groove 48 of the spacer layer 38 between the pair of notches 80 and 82 about the intermediate sheet. The tapered end 72 was telescoped into the end 76 of the spacer. As the spacer was positioned about the glass sheet 26, the bent portions 58 at the corners moved the adhesive of the shaped layer 38 toward the corner of the glass sheet 26 as previously discussed.

The outer glass sheets 22 and 24 were thereafter positioned over the sealant adhesive 32 and biased toward one another to flow the adhesive 32 and secure the outer glass to the spacer. Thereafter the adhesive 44 was flowed into the channel formed by the peripheral edges of the sheets and the base of the spacer.

As can be appreciated the holes 74 and 78 in the substrate for the unit made were aligned with each and with the edge of the intermediate sheet. Therefore the hole was sealed with polyol polyisobutylene and sealed over with the adhesive layer 44. In the practice of the invention, it is recommended that the hole or holes (shown in FIG. 4 as dotted lines 92) be offset from the intermediate sheet 26 and a close end rivet used to secure the ends of the spacer together. In this case the polyol polyisobutylene is not required to seal the compartment.

The discussion will now be directed to a nozzle incorporating features of the invention used to provide the shaped layer 38. With reference to FIGS. 5–7 there is shown nozzle arrangement 100 having a conditioning chamber 102 and a nozzle 104 secured thereto in any convenient manner e.g. by screws. The conditioning chamber 102 is connected by hose or conduit 106 to a supply of the adhesive material (not shown). In the instance where the material is a hot melt adhesive, the conditioning chamber 102 is provided with heating elements to heat the adhesive to its flow temperature; in the instance where the adhesive is a two component adhesive, the adhesive is mixed in the conditioning chamber 102.

With specific reference to FIGS. 6 and 7, the nozzle 104 has a base 108 supporting a raised platform 110 having a pair of opposite flat sides 112 clearly shown in FIG. 6. The platform 110 has a forming surface including a forming tip 114 that forms the shaped layer 38 in a manner to be discussed. The forming tip 114 has a generally arrow shaped end 116 narrower than opposite end 118. The end 116 is lower in height than the end 118 with the end 118 sloping toward the platform 110 as shown by numeral 120 in FIG. 7. In practice the U-shaped spacer 30 advances from left to right as shown in FIG. 7. As the lead end of the spacer 30 engages the tip 114 the sloped end 120 biases the leading end of the spacer downward as viewed in FIG. 7 against conveyor 122 in those instances where the lead end of the spacer is raised. As the spacer advances past the nozzle 104 the adhesive is extruded through holes 124 and 126 onto the base of the spacer as the forming tip 124 shapes the adhesive to provide the shaped layer 38 on the base of the spacer.

In the practice of the invention for making the unit discussed above, the base 108 had an outside diameter of about 2½ inches (6.35 cm) and a thickness of about ¼ inch (0.635 cm). The platform 110 had a height of about ⅜ inch (0.95 cm). The platform was circular with a diameter of about 0.52 inch (1.37 cm) except for the flat sides 112 that are spaced from each other about 0.485 inches (1.23 cm) and each have a length of about 0.23 inch (0.53 cm). The tip 114 at the narrow end 116 has a width of about 0.028 inch (0.020 cm) and expands toward the center line of the tip to a width of about 0.062 inch (0.157 cm). The slope surface 120 starts at the edge of the platform 110 and terminates about 0.125 inch (0.37 cm) therefrom. With reference to FIG. 7, the tip 114 at the sloped end 118 has a height of about 0.080 inch (0.20 cm) and at the narrow end 116 of about 0.065 inch (0.165 cm). The holes 124 in the platform each had a diameter of about 0.120 inch (0.3 cm) and the hole 126 in the tip had a diameter of about 0.093 inch (0.236 Cm).

In practice, H. B. Fuller adhesive HL-5102-X-125 having a desiccant therein is heated to about 250° F. (482° C.). As the U-shaped spacer 30 moves past the nozzle 104, the platform 110 is positioned between the outer legs 34 and 36 of the spacer with the highest portion of the tip 114 e.g. end 118 of the tip spaced about 1/32 inch (0.08 cm) from the base 42 of the spacer 36. As the spacer 30 moves past the nozzle the sloped end 120 urges the leading edge of the spacer downward, if lifted, toward the conveyer as adhesive is extruded from the holes 124 and 126 to provide the shaped layer 38.

The narrow portion of the tip and the step of the tip prevent tailing of the adhesive when the flowing e.g. pumping or extrusion of the material is stopped. It is expected that providing a step for the platform 110 similar to that of the tip will further ensure elimination of tailing.

Figure 8:
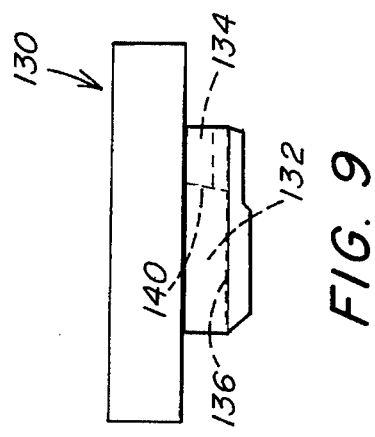
FIG. 8 is a side view similar to the view of FIG. 6 illustrating another embodiment of a tip incorporating features of the invention.
Figure 9:
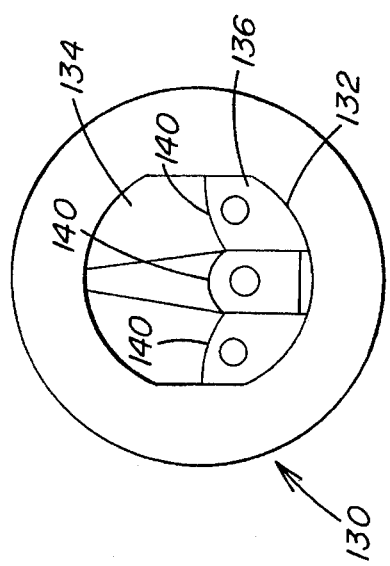
FIG. 9 is a view similar to the view of FIG. 7 illustrating further details of the tip of FIG. 8

With reference to FIGS. 8 and 9, there is shown nozzle 130 having platform 132. The nozzle 130 is similar to the nozzle 104 except the platform 132 is provided with a lower portion 134 and a raised portion 136 and the platform and nozzle where the change in elevation occurs is radiused surface 140 as shown in FIG. 8. It is expected that the radiused surfaces 140 and change in elevation will eliminate tailing.

The term "tailing" as used herein is the noted effect that occurs when the flowing e.g. pumping or extrusion of the material is stopped but due to the adhesive adhering to the nozzle, strings of adhesive are pulled.

Figure 10:
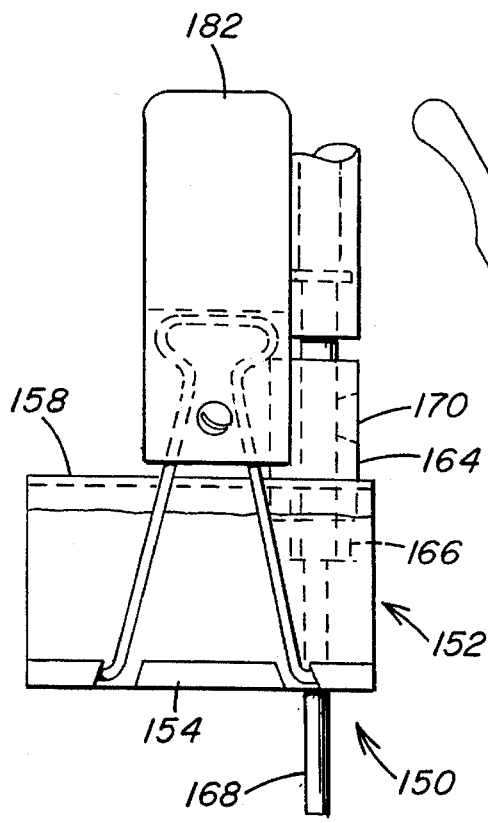
FIG. 10 is a side elevated view of an injector arrangement of the invention for filling the compartments of a glazing unit with an insulating gas.

In the instance where an insulating unit e.g. the unit 20 shown in FIGS. 1 and 2 has an insulating gas between adjacent glass sheets 22, 26 and 26, 24, the insulating gas may be flowed into the compartment between the glass sheets in any convenient manner. For example and with reference to FIGS. 10 and 11 there is shown injector arrangement 150 that may be used to move an insulating gas into a compartment while removing air in the compartment through a single spacer hole. The injector arrangement 150 includes a spring biased bifurated member 152 having outer legs 154 and 156 connected to a base 158. The spring member 152 is made of spring metal such that the legs 154 and 156 are spring biased toward one another to engage the glazing unit in a manner discussed below. The member 152 used in the practice of the invention was a binder clip.

Figure 11:
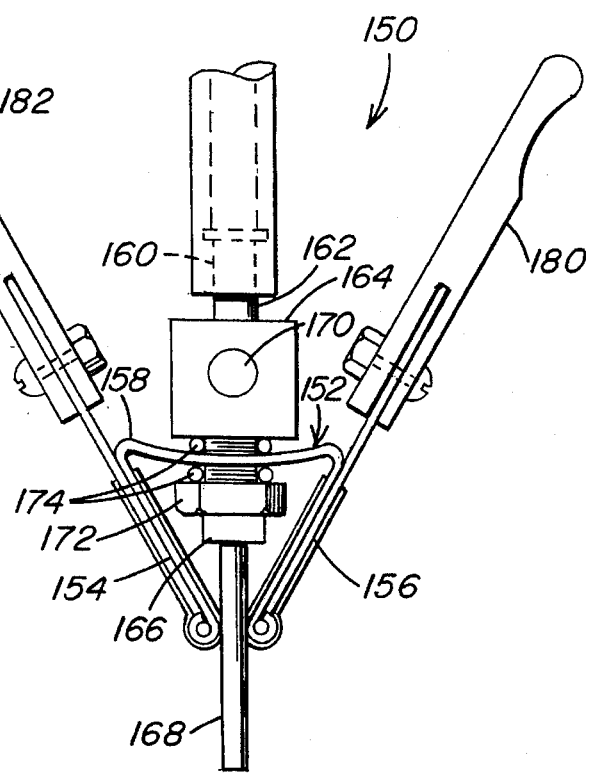
FIG. 11 is an end view of the injector arrangement of FIG. 10.

An inner tube 160 has an enlarged end 162 mounted in a housing 164 and passes through the housing. The tube 160 extends beyond the housing and outer tube 166 and is shown in FIG. 11 as end 168. The end 168 of the tube 160 is sized for insertion through the base 42 of the spacer 30 (see FIG. 2). The housing 164 has a hole 170 that provides access to the hollow interior of the housing. The outer tube 166 has end connected to the housing 164 and has external threads thereon. The housing arrangement is secured to the base 158 of the member 152 by passing the outer tube through a hole (not shown) in the base 158. A nut 172 threaded on the outer tube 166 engages 0 rings 174 on each side of the base 158 about the tube 166 to capture the base between the housing 164, the 0 rings 174 and the nuts 172 as shown in FIG. 11.

Figure 12:
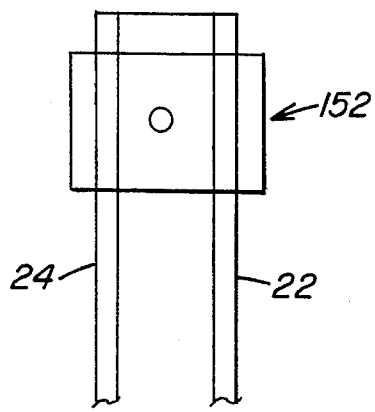
FIG. 12 is a view illustrating the use of the injector arrangement of the invention to fill a unit having a single compartment with an insulating gas.

In practice the end 162 of the inner tube 160 is connected to an Argon supply (not shown), and the injector arrangement clamped to the unit by spreading the legs 154 and 156 apart by urging members 180 and 182 toward one another and inserting the end 168 of the inner tube 160 in a hole (not shown) in the spacer e.g. aligned holes in the substrate 70. The members 180 and 182 are released to clamp the nozzle arrangement 152 on the edge of a unit as shown in FIG. 12. It is recommended that the clamp engage the glass at the edge assembly of the unit e.g. edge assembly 28 of the unit 20 shown in FIG. 2, to prevent damage to the glass. As Argon moves into the unit through the inner tube 168, air in the compartment between the sheets is displaced and moves out of the compartment through the annulus between the outer tube 166 and the inner tube 160 through the housing 164 and out of the hole 170. After the compartment is filled with Argon the nozzle is removed and the hole sealed in any convenient manner e.g. with a sealant or a closed end rivet.

Figure 13:
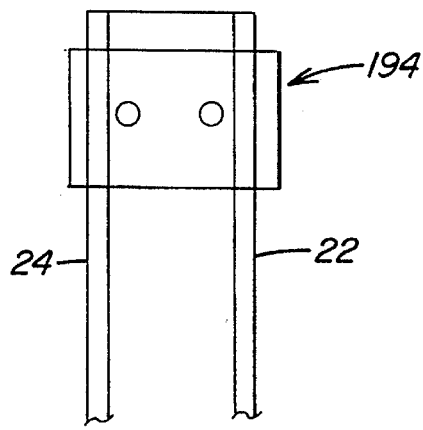
FIG. 13 is a view similar to the view of FIG. 12 illustrating the use of the injector arrangement of the instant invention to fill a unit having two sealed compartments.

When the unit has one chamber e.g. as taught in The EP Application, one nozzle centrally located as shown in FIG. 12 is preferred. When the unit has two or more compartments e.g. unit 20 shown in FIG. 2, one nozzle may be used for each compartment or a nozzle arrangement having two nozzles may be used e.g. nozzle arrangement 194 shown in FIG. 13.

Figure 14:
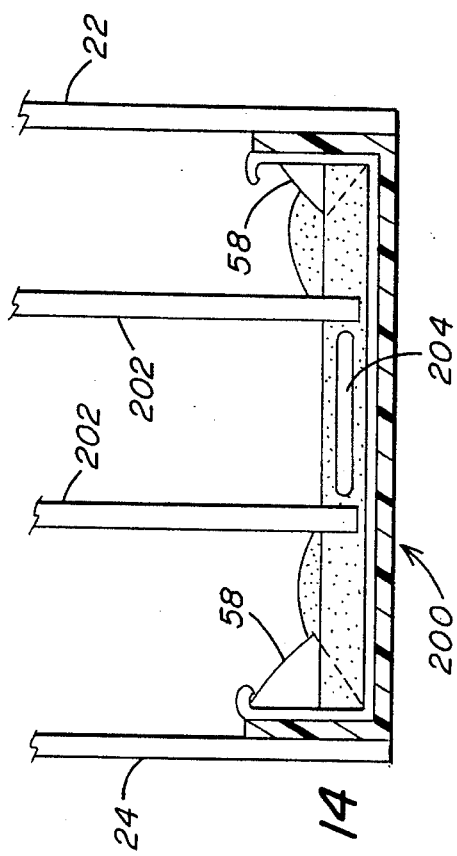
FIG. 14 is a view similar to the view of FIG. 2 showing an insulating unit having three compartments incorporating features of the invention.

As can now be appreciated the invention is not limited to making a triple glazed unit. For example as shown in FIG. 14 there is a unit 200 having four glass sheets 22, 24 and 202. When more than three sheets are used, a blank or spacer 204 may be used between glass sheets 202 shown in FIG. 14. Further, the intermediate sheet may have a hole drilled therein to interconnect the compartments of the triple glazed unit.

What is claimed is:

1. A method of making an insulating glazing unit having at least three sheets comprising the steps of:

providing three sheets, two of the sheets defined as a first outer sheet and a second outer sheet, and the third sheet defined as an intermediate sheet;

providing a flat substrate having opposed edges and a leading end between the opposed edges and a major surface between the opposed edges with center portion of the major surface between and spaced from the opposed edges defined a receiving surface;

shaping the flat substrate to provide a spacer having a predetermined length, a base, a first outer leg extending upwardly from the base, a second outer leg extending upwardly from the base and spaced from the first outer leg to provide the spacer with a general U-shaped cross section wherein surface of the base facing the space between the first and second outer leg is the receiving surface;

flowing a layer of a pliable material onto the receiving surface the layer having spaced raised portions with a depression between the spaced raised portions, the depression defined as a groove;

encircling the intermediate sheet with the spacer while positioning the peripheral edge portions of the intermediate sheet in the groove to provide a spacer frame about the intermediate sheet where the first and second outer legs of the spacer are first and second outer legs respectively of the spacer frame, wherein during the practice of the encircling step the spaced raised portions of the layer of the pliable material limit movement of the intermediate sheet toward outer legs of the spacer frame; and securing the outer legs of the spacer frame and the outer sheets together to provide respective compartments between one of the outer sheets and the intermediate sheet and the other outer sheet and the intermediate sheet.

2. The method of claim 1 wherein the sheets are glass sheets.

3. The method of claim 2 further including the step of providing an environmental coating on at least one of the major surfaces of at least one of the sheets.

4. The method of claim 3 wherein the environmental coating is a low E coating and further including the step of providing a reflective coating on another at least one of the major surfaces of at least one of the sheets.

5. The method of claim 2 wherein the sheets are colored glass sheet.

6. The method of claim 1 wherein the pliable material is a pliable adhesive and said step of flowing a layer includes the step of providing a desiccant in the pliable adhesive and during the practice of the flowing step the adhesive adheres to the receiving surface.

7. The method of claim 6 wherein the spacer frame is one continuous piece and the step of encircling the intermediate sheet includes the step of biasing portions of the outer legs of the spacer toward one another over the receiving surface of the spacer spaced from the intermediate sheet to move the pliable material toward the intermediate sheet, the portions of the outer legs are biased toward one another and spaced from the intermediate sheet limiting movement of the intermediate sheet toward the first or second outer legs and said securing step includes the step of providing a layer of a moisture and/or gas impervious adhesive between the marginal edges of the first and second sheets and adjacent outer surface of the first and second legs.

8. The method of claim 7 wherein the sheets, the glazing unit and the spacer frame each have a parallelepiped shape and the portions of the outer legs are biased toward one another at selected corners of the spacer frame.

9. The method of claim 6 wherein the step of securing the outer legs of the spacer frame to the outer sheets includes the step of providing a layer of a moisture and/or gas impervious material between the outer sheets and outer surface of the outer legs of spacer frame and therein the spacer frame, the layer of flowable material and the layer of the moisture and/or gas impervious material define an edge assembly further including the step of selecting the material of the spacer frame, the material of the layer of pliable material and the material of the layer of moisture and/or gas impervious material to provide an edge assembly having a RES-value of equal to or greater than 10 as determined using the ANSYS program.

10. The method of claim 1 wherein the layer of the pliable material is a moisture and/or gas pervious material that is flowable during the practice of the encircling step and is dimensionally stable after the practice of the encircling step and has a desiccant therein, and wherein the opposed edges of the substrate are opposed edges of the outer legs of the spacer and the spacer frame wherein the edges of the first and second legs of the spacer frame are spaced from the intermediate sheet and having only gas therebetween.

11. The method according to claim 1 wherein the step of flowing a layer of a pliable material is practiced prior to the step of shaping the flat substrate.

12. The method according to claim 1 wherein the step of flowing a layer of a pliable material is practiced after the step of shaping the flat substrate.

13. The method according to claim 1 wherein the spacer is made from a continuous substrate and the spacer frame is made from a continuous spacer, the flat substrate has a first outer portion between an opposed edge and the center portion of the substrate and a second outer portion between the other opposed edge and the center portion of the substrate and the step of providing a flat substrate include the step of:

removing a portion of the first outer portion defined as a first notch and a portion of the second outer portion opposite to the first notch defined as a second notch, the notches after the practice of the shaping step are in the outer legs of the spacer and during the practice of the encircling step the spacer is bent at the notches.

14. The method according to claim 13 wherein during the practice of the step of removing a portion, the first notch starts at the edge of the first outer portion, extends toward the center portion and terminates short of and spaced from the center portion of the substrate and the second notch starts at the edge of the second outer portion, extends toward the center portion and terminates short of and spaced from the center portion of the substrate.

15. The method according to claim 14 further including the step of imposing a generally "V" shaped crease line defined as a first "V" crease line in the first outer portion of the substrate, the open end of the first "V" crease line about the first notch and the closed end terminating adjacent the center portion of the substrate and a generally "V" shaped crease line defined as a second "V" crease line in the second outer portion of the substrate, the open end of the second "V" crease line about the second notch and the closed end terminating adjacent the center portion of the substrate, the "V" crease lines after the practice of the shaping step are in the outer legs of the spacer and during the practice of the encircling step the spacer is bent at the "V" shaped crease lines.

16. The method according to claim 15 wherein the sheets and the spacer frame have a parallelepiped shape the imposing step is practiced at least three times and during the encircling step the spacer is bent at least three times to form at least three corners of the spacer frame wherein the portion of the outer legs of the spacer as they are bent inwardly move the pliable material toward the intermediate sheet to further limit movement of the intermediate sheet toward the outer legs of the spacer frame.

17. The method according to claim 16 wherein the insulating unit has a peripheral groove provided by the spacer frame spaced inwardly from peripheral edges of the outer sheets and further including the step of flowing a moisture and/or gas impervious material into the peripheral groove.

18. The method of claim 17 further including the step of providing an insulating gas between one of the outer sheets and the intermediate sheet defined as a first compartment and the other one of the outer sheets and the intermediate sheet defined as a second compartment.

19. The method according to claim 1 wherein the spacer is made from a continuous substrate and the spacer frame is made from a continuous spacer, the flat substrate has a first outer portion between an opposed edge and the center portion of the substrate defined as a first outer portion and a second outer portion between the other opposed edge and the center portion of the substrate defined as a second outer portion and the step of providing a flat substrate include the step of:

imposing a generally "V" shaped crease line in the first outer leg defined as a first "V" crease line, the open end of the first "V" crease line at the edge and the closed end of the first "V" crease line terminating adjacent the center portion of the substrate and a generally "V" shaped crease line in the second outer leg defined as a second "V" crease line, the open end of the second "V" crease line at the edge and the closed end of the second "V" crease line terminating adjacent the center portion of the substrate, the first and second "V" crease lines opposite one another and during the practice of the encircling step the spacer is bent at the "V" crease lines.

20. The method according to claim 19 wherein the sheets and the spacer frame have a parallelepiped shape, the imposing step is practiced at least three times and during the encircling step the spacer is bent at least three times at the "V" crease lines to form at least three corners of the spacer frame wherein the portion of the outer legs of the spacer as they are bent inwardly move the pliable material toward the intermediate sheet to further limit movement of the intermediate sheet toward the outer legs of the spacer frame.

* * * * *

UNITED STATES PATENT AND TRADEMARK OFFICE
CERTIFICATE OF CORRECTION

PATENT NO. : 5,601,677
DATED : February 11, 1997
INVENTOR(S) : Edmund A. Leopold It is certified that error appears in the above-indentified patent and that said Letters Patent is hereby corrected as shown below:

```
Claim 1, line 15, delete "general" and insert --generally--;
         line 17, delete "leg" and insert --legs--;
         line 20, after "surface" insert --,--; and
         line 26, delete "where" and insert --wherein--.
Claim 7, line 9, after "legs" insert --;--.
Claim 9, line 5, after "of" insert --the--;
         same line, delete "therein" and insert --wherein--.
```

Signed and Sealed this

Twentieth Day of May, 1997

Attest:

BRUCE LEHMAN

*Attesting Officer*     Commissioner of Patents and Trademarks